US 10,713,425 B2

(12) United States Patent
Dent et al.

(10) Patent No.: US 10,713,425 B2
(45) Date of Patent: Jul. 14, 2020

(54) SYSTEM AND METHOD FOR GENERATING A PROPOSAL BASED ON A REQUEST FOR PROPOSAL (RFP)

(71) Applicant: Palo Alto Research Center Incorporated, Palo Alto, CA (US)

(72) Inventors: Kyle D. Dent, San Carlos, CA (US); Filip Masri, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 16/105,300

(22) Filed: Aug. 20, 2018

(65) Prior Publication Data

US 2020/0057799 A1 Feb. 20, 2020

(51) Int. Cl.
*G06F 17/00* (2019.01)
*G06F 40/166* (2020.01)
*G06F 16/93* (2019.01)
*G06F 40/103* (2020.01)
*G06F 40/137* (2020.01)
*G06F 40/284* (2020.01)
*G06Q 30/06* (2012.01)

(52) U.S. Cl.
CPC ............ *G06F 40/166* (2020.01); *G06F 16/93* (2019.01); *G06F 40/103* (2020.01); *G06F 40/137* (2020.01); *G06F 40/284* (2020.01); *G06Q 30/0611* (2013.01)

(58) Field of Classification Search
CPC .... G06F 17/24; G06F 17/2241; G06F 17/277; G06F 17/211; G06F 16/93; G06F 40/166; G06F 40/174; G06F 40/103; G06F 40/137; G06F 40/284; G06Q 30/0611
See application file for complete search history.

(56) References Cited

U.S. PATENT DOCUMENTS

| 6,904,454 | B2 * | 6/2005 | Stickler | G11B 27/32 375/E7.024 |
| 10,089,585 | B1 * | 10/2018 | Alexander | G06K 9/6215 |
| 2003/0074298 | A1 * | 4/2003 | Daum | G06Q 30/06 705/37 |
| 2003/0093434 | A1 * | 5/2003 | Stickler | G06F 8/76 |
| 2007/0067371 | A1 * | 3/2007 | Allan | G06F 16/288 |
| 2007/0067461 | A1 * | 3/2007 | Savchenko | H04L 67/02 709/227 |
| 2010/0070448 | A1 * | 3/2010 | Omoigui | H01L 27/1463 706/47 |

(Continued)

*Primary Examiner* — Laurie A Ries
(74) *Attorney, Agent, or Firm* — Shun Yao; Park, Vaughan, Fleming & Dowler LLP

(57) ABSTRACT

Embodiments described herein provide a system for generating a draft proposal. During operation, the system obtains a schema that represents a general model of a request for proposal (RFP). The system generates a structured RFP from an RFP document by structuring one or more elements of the RFP document in the structured RFP based on the schema. The system then generates a proposal outline comprising one or more sections. A respective one of the one or more sections corresponds to one of the one or more elements. The system obtains a piece of content for a respective section of the one or more sections based on a requirement specified in an element corresponding to the section and inserts the piece of content in the section of the proposal outline.

20 Claims, 13 Drawing Sheets

(56) References Cited

U.S. PATENT DOCUMENTS

| | | | |
|---|---|---|---|
| 2013/0124243 A1* | 5/2013 | Johnson | G06Q 10/0631 |
| | | | 705/7.12 |
| 2014/0281850 A1* | 9/2014 | Prakash | G06F 17/218 |
| | | | 715/202 |
| 2016/0110313 A1* | 4/2016 | Prakash | G06F 17/2288 |
| | | | 715/202 |
| 2017/0286456 A1* | 10/2017 | Wenzel | G06F 16/212 |
| 2017/0300535 A1* | 10/2017 | Papineni | G06F 16/332 |
| 2017/0337605 A1* | 11/2017 | Codella | G06Q 30/0611 |
| 2019/0155870 A1* | 5/2019 | Prakash | G06F 40/103 |
| 2020/0042531 A1* | 2/2020 | Bhojarajan | G06F 16/2379 |

\* cited by examiner

SYSTEM AND METHOD FOR GENERATING A PROPOSAL BASED ON A REQUEST FOR PROPOSAL (RFP)

FIELD

This disclosure is generally related to the field of artificial intelligence (AI). More specifically, this disclosure is related to a system and method for generating a proposal document based on a request for proposal (RFP).

RELATED ART

A request for proposal (RFP), which can also be known as a request for information or a request for quotation, is a document used by companies, organizations, and agencies to solicit bids for products or services from suppliers and/or service providers. The suppliers and/or service providers, in response, write proposals based on the RFPs with descriptions of their products or services addressing specific requirements and questions presented in the RFP.

Currently, responding to RFPs is largely a manual process. An enterprise may employ dedicated bid teams or assemble ad-hoc teams as needed. Team members read RFP documents looking for requirements and questions that must be addressed in the response proposal. The manual process generally includes the team members reading the RFP to understand the content and extract specific requests for information that must be answered. Based on the understanding, the enterprise assigns the extracted information requests to individuals to provide the content. Either using existing text from previous proposals, technical reports, or marketing materials, or creating new content, the individuals identify or generate the content for their assigned requests. The team members also gather other required supporting documents such as price lists, certifications or proof of insurance and assemble content (text, graphics, charts, etc.) and supporting documents into a proposal package. One or more team members (e.g., a manager) can review the proposal package and submits it to the soliciting organization.

However, manually generating a proposal is time-consuming and error-prone. To improve the proposal generation process, the enterprise may maintain a database of past responses, which can be a collection of past proposals. Snippets of these proposals can be used in future proposals. Using the text of the RFP and their own human reasoning, the team members can use keyword search on the database to find and select the snippets for the proposal.

While a database of past proposals brings many desirable features to proposal generation, some issues remain unsolved for streamlining the proposal generation process based on the requirements set by an RFP.

SUMMARY

Embodiments described herein provide a system for generating a draft proposal. During operation, the system obtains a schema that represents a general model of a request for proposal (RFP). The system generates a structured RFP from an RFP document by structuring one or more elements of the RFP document in the structured RFP based on the schema. The system then generates a proposal outline comprising one or more sections. A respective one of the one or more sections corresponds to one of the one or more elements. The system obtains a piece of content for a respective section of the one or more sections based on a requirement specified in an element corresponding to the section and inserts the piece of content in the section of the proposal outline In a variation on this embodiment, the system generates a draft proposal by populating a respective section of the one or more sections using a corresponding piece of content.

In a further variation, the system obtains formatting information for a proposal from the structured RFP. The draft proposal is then in a format indicated by the formatting information.

In a variation on this embodiment, the system obtains the piece of content by determining whether the requirement specified in the element matches an entry in a repository of past proposals and, upon finding a match in the repository, retrieving the piece of content from the entry in the repository.

In a further variation, the system identifies a piece of content in a past proposal that matches an element of the schema and stores the piece of content in the repository.

In a further variation, if the system does not find a match in the repository, the system obtains the piece of content by generating the piece of content from an organizational knowledge graph or obtaining the piece of content from a user.

In a further variation, the system facilitates a specialized user interface to the user. The user interface is used for one or more of: verifying the generated piece of content and obtaining the piece of content.

In a further variation, the system can update the piece of content obtained from the repository prior to inserting the piece of content in the proposal outline.

In a variation on this embodiment, the system structures an element of the RFP document in the structured RFP by matching attributes and values of the element in the RFP document to an element of the schema and incorporating the attributes and values into the structured RFP in a structure of the element in the schema.

In a further variation, the system tokenizes the RFP document into a token stream and identifies the attributes and values in the token stream.

BRIEF DESCRIPTION OF THE FIGURES

In the figures, like reference numerals refer to the same figure elements.

DETAILED DESCRIPTION

Figure 1A:
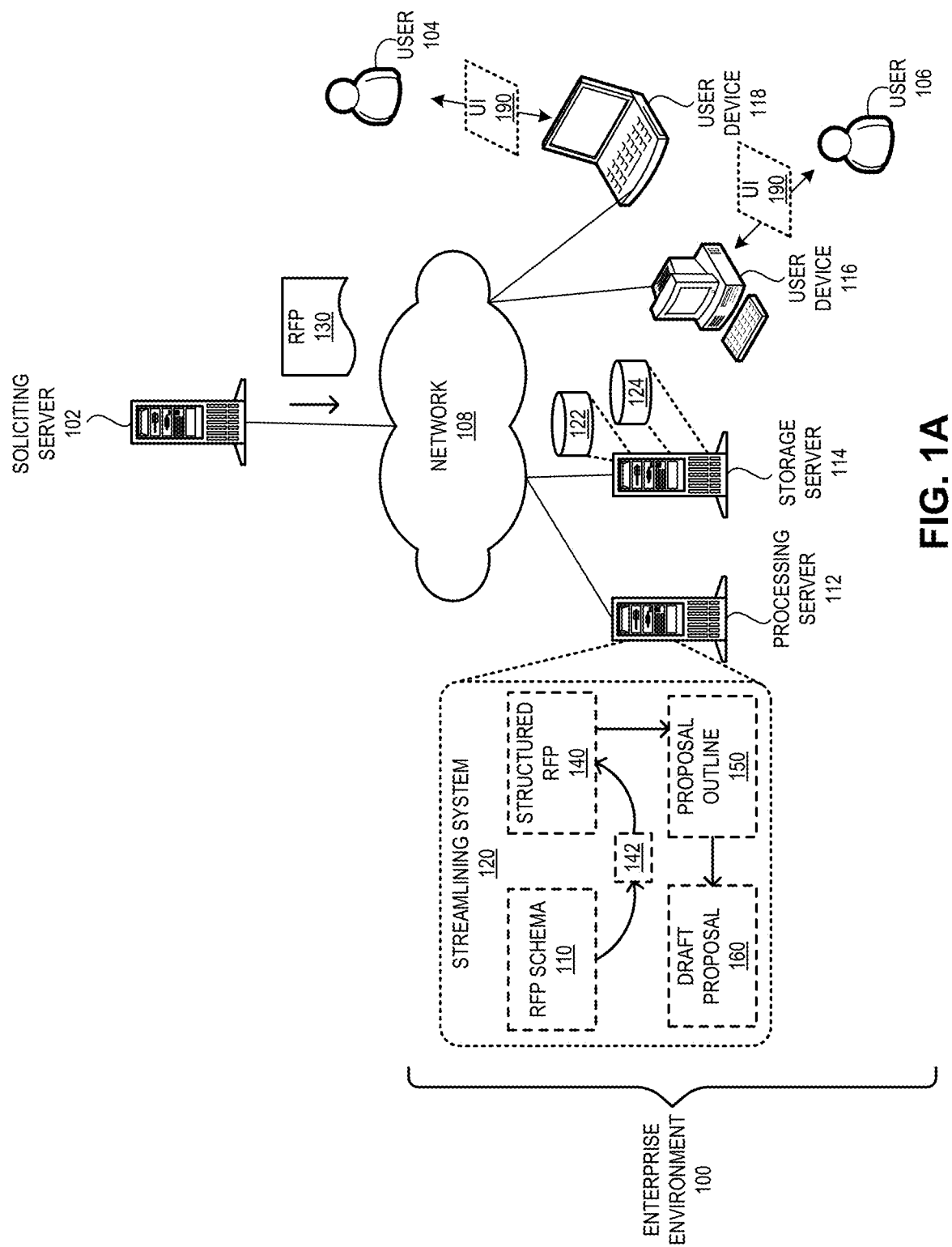
FIG. 1A illustrates an exemplary streamlining system for generating a proposal based on an RFP, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of automatically generating a draft proposal from an RFP by (i) automatically populating a repository of old proposals in a structured way; (ii) generating a structured schema of the RFP; and (iii) generating a draft proposal by incorporating content corresponding with each element of the schema into the draft proposal based on the requirement specified in the element. The content can be retrieved from the repository, generated using a knowledge base of an enterprise, or obtained from an expert.

Typically, when a soliciting entity publishes an RFP seeking products and/or services, an enterprise may submit a proposal outlining how the enterprise may facilitate the products and/or services in a competitive way. To do so, the enterprise may designate one or more employees to analyze the RFP and draft a proposal addressing the requirements specified in the RFP. However, this process can be time-consuming and error-prone. In addition, the enterprise may repeat the same process for different RFPs, which can be inefficient.

With existing technologies, project management tools can ease the burden of human analysis by maintaining databases of proposal contents. For example, these tools may maintain a database of proposal contents and help employees understand the contents of RFPs as well as help organize the work around proposal preparation (e.g., managing tasks). However, these tools still rely on manually populating the database with existing proposal contents, which is also time-consuming and error-prone. Furthermore, these tools still rely on human analysis of the RFP and manual searches on the database to produce the proposal. As a result, even with these tools, the proposal generation process is largely manual.

To solve these problems, embodiments described herein provide a streamlining system that generates a draft proposal by automatically incorporating pieces of content to address questions and requirements specified in an RFP. The system can generate a general outline, or a schema, of an RFP, that includes a set of schema elements. A respective element corresponds to a piece of information that a generic RFP may include. In other words, the RFP schema is a general model of an RFP. Examples of an element include, but are not limited to, scope of work, key performers and corresponding expertise, insurance information, organizational history, team biography, and product information (e.g., pricing information). A respective element can include one or more designated fields corresponding to attributes of the RFP. For example, if the element is product information, the designated fields can be product name, information, and pricing.

The system can then parse previous proposals generated/submitted by an enterprise for the elements defined in the schema and extract pieces of content (e.g., a snippet of text) from the proposals. For example, if an element in the schema corresponds to insurance information, the system can extract insurance information from a respective previous proposal and store that piece of content in a repository. In this way, the system can automatically populate the repository with pieces of content from the previous proposals that can be reused for a new proposal. In some embodiments, the contents are stored in the repository in such a way that the system can search the contents in the repository using a keyword.

During operation, the system can obtain an RFP from a soliciting entity. Based on the schema, the system can generate a structured outline of the RFP. The structured outline can be considered as a container and include a number of slots. Each slot can correspond to an element of the schema. The structured outline can also include slots for RFP-specific information, which may not be generic to other RFPs. A respective slot can be populated with the texts extracted from the RFP. The system can use one or more computational techniques to identify a text segment, which includes attributes and values, of the RFP that matches a slot of the structured outline. Examples of a computational technique include, but are not limited to, string pattern matching and statistical modeling. The system then inserts the extracted text into the matched slot of the structured outline. The system repeats this process for a respective slot of the structured outline. In this way, the system populates that structured outline, thereby generating a structured representation of the RFP, which can be referred to as a structured RFP.

The structured RFP is a machine-readable version of the RFP from which the system can retrieve information. Each slot of the structured outline, when populated, becomes an element of the structured RFP. The system can determine the content of a draft proposal from the structured RFP and generate a proposal outline comprising a number of sections, each corresponding to an element of the structured RFP. For a respective section of the outline, the system checks whether a piece of content in the repository can be inserted into the section. For example, if the section is for key performers, the system checks whether requirements specified by the corresponding element of the structured RFP match the key performers of a previous proposal. Upon finding a piece of content that matches, the system can insert the piece of content into the section.

If the system does not find a match, the system can use text generating techniques, such as natural language processing (NLP), to generate text based on the knowledge base of the enterprise. The knowledge base can represent a knowledge graph indicating the offerings and capabilities of the enterprise. The system can apply the text generating technique to the knowledge graph to generate the text for the section of the proposal outline. For example, if the section is for insurance information, the system can retrieve the insurance subscription information of the enterprise from the knowledge base and generate text that describes the retrieved information. The system may use a user feedback to verify the generated text and insert the text into the section.

If the system cannot generate the text for the section from the knowledge base, the system can use a specialized user interface to solicit the corresponding information from a human expert. The system then inserts the obtained information into the section. By repeating this process for a respective section of the outline, the system populates the outline. The system can also obtain formatting information associated with the RFP (e.g., page limitations, acceptable document format, etc.) from the structured RFP. The system can use the formatting information to generate a draft proposal from the outline.

Exemplary System

FIG. 1A illustrates an exemplary streamlining system for generating a proposal based on an RFP, in accordance with an embodiment of the present application. In this example, an enterprise environment 100 of an enterprise includes a number of computing devices, such as user devices 116 and 118, using which employees of the enterprise can access the devices and services of enterprise environment 100. The enterprise can provide products and/or services to other entities (e.g., companies, organizations, and agencies). Suppose that such an entity solicits for products and/or services in an RFP 130. The soliciting entity can publish the RFP 130 on a server, such as soliciting server 102, of the soliciting entity.

Typically, employees of the enterprise may become aware of RFP 130 based on a published notice (e.g., on a newspaper or on the Internet) or a notification (e.g., an email). If the products and/or services requested in RFP 130 match the products and/or services provided by the enterprise, the enterprise may submit a proposal outlining how the enterprise may facilitate the products and/or services to the soliciting entity in a competitive way. To do so, the enterprise may designate one or more employees to obtain RFP 130 from server 102, and analyze RFP 130 and draft a proposal addressing the requirements specified in RFP 130. However, this process can be time-consuming and error-prone. In addition, the enterprise may repeat the same process for different RFPs, which can be inefficient.

With existing technologies, a project management tool can ease the burden of analysis on the employees by maintaining databases of proposal contents. For example, enterprise environment 100 can include a storage server 114 that may maintain a database of proposal contents. The tool can access the database to help employees to retrieve the contents that an employee may copy to a proposal based on his/her understanding of RFP 130. However, that database may need to be manually populated with the proposal contents, which is also time-consuming and error-prone. Furthermore, the tool still relies on human analysis of RFP 130 and manual searches of the database. As a result, even with the tool, the proposal generation process is largely manual.

To solve these problems, enterprise environment 100 can include a processing server that runs a streamlining system 120, which can generate a draft proposal by automatically incorporating pieces of content that address questions and requirements specified in RFP 130. System 120 can generate an RFP schema 110 comprising a set of elements that is typically included in an RFP. System 120 analyzes the previous proposals generated by the enterprise and extracts pieces of content (e.g., a snippet of text and/or one or more figures) from the proposals. System 120 then stores the extracted pieces of content in a repository 122 on storage server 114. System 120 can also maintain a knowledge base 124, which can store information associated with the offerings and capabilities of the enterprise. In some embodiments, repository 122 and/or knowledge base 124 can be database instances of a relational database system.

During operation, system 120 can obtain RFP 130 from server 102 via a network 108 (e.g., a local or a wide area network or the Internet). Based on schema 110, system 120 can generate a structured outline 142 of RFP 130. Outline 142 can be considered as a container and include a number of slots. A respective slot can be populated by system 120 with the content of RFP 130 that corresponds to a component of schema 110. System 120 can use one or more computational techniques to identify a text segment, which includes attributes and values, of RFP 130 that matches a slot of outline 142. System 120 then inserts the extracted text into the matched slot of outline 142. System 120 can repeat this process for a respective slot of outline 142. In this way, system 120 populates outline 142, thereby generating a structured representation of RFP 130, which is referred to as structured RFP 140.

System 120 can also obtain formatting information associated with RFP 130 (e.g., page limitations, acceptable document format, etc.) from structured RFP 140. System 120 can determine what should be the content of a draft proposal from structured RFP 140 and generate a proposal outline 150 comprising a number of sections based on the formatting information. Each section can correspond to an element of structured RFP 140. Proposal outline 150 can be in a document type that can be updated (e.g., a word processing document). For a respective section of proposal outline 150, system 120 checks whether a piece of content in repository 122 can be inserted into the section. For example, if the section is for key performers, system 120 checks whether requirements specified by the corresponding element of structured RFP 140 match an entry in repository 122 (e.g., the key performers of a previous proposal). Upon finding a piece of content that matches the corresponding element of structured RFP 140, system 120 can insert the piece of content into the section of proposal outline 150.

If system 120 does not find a match in repository 122, system 120 can use text generating techniques, such as NLP, to generate text based on knowledge base 124. The knowledge base can represent a knowledge graph of the offerings and capabilities of the enterprise. System 120 then uses the knowledge graph to generate text for the section of proposal outline 150. For example, if the section is for pricing information, system 120 can retrieve the pricing information of the products of the enterprise from knowledge base 124, obtain the product information for the products specified in the corresponding element of structured RFP 140, and generate texts/figure(s) indicating the pricing information.

System 120 may ask an employee, such as user 106, to verify the text/figure(s) via a specialized user interface (UI) 190. Upon verification, system 120 inserts the text into the section of proposal outline 150. If system 120 cannot generate the text for the section based on knowledge base 124, system 120 can use UI 190 to solicit the corresponding information from user 104, who can be a human expert for the subject matter associated with the section. System 120 can maintain a list of employees and their area of expertise in knowledge base 124 and solicit information from user 104 based on a match between the requirement of the section and the expertise of user 104. System 120 then obtains the text (and figures) provided by user 104 via UI 190 and inserts the obtained text (and figures) into the section of proposal outline 150.

In this way, system 120 can populate a respective section of proposal outline 150 by matching past proposal content in repository 122, generating text based on the knowledge graph indicated by knowledge base 124, or soliciting information from human experts who can supply new content for insertion into proposal outline 150. By repeating this process for a respective section of proposal outline 150, system 120 populates proposal outline 150 to generate draft proposal 160. In some embodiments, system 120 can store proposal outline 150 in repository 122. If system 120 identifies a new RFP that is similar to RFP 130, system 120 can directly obtain proposal outline 150 for that new RFP. System 120 can present draft proposal 160 to user 104 and/or user 106 via UI 190 for verification. User 104, user 106, and/or any other user can review and/or update draft proposal 160 and generate a final proposal.

Figure 1B:
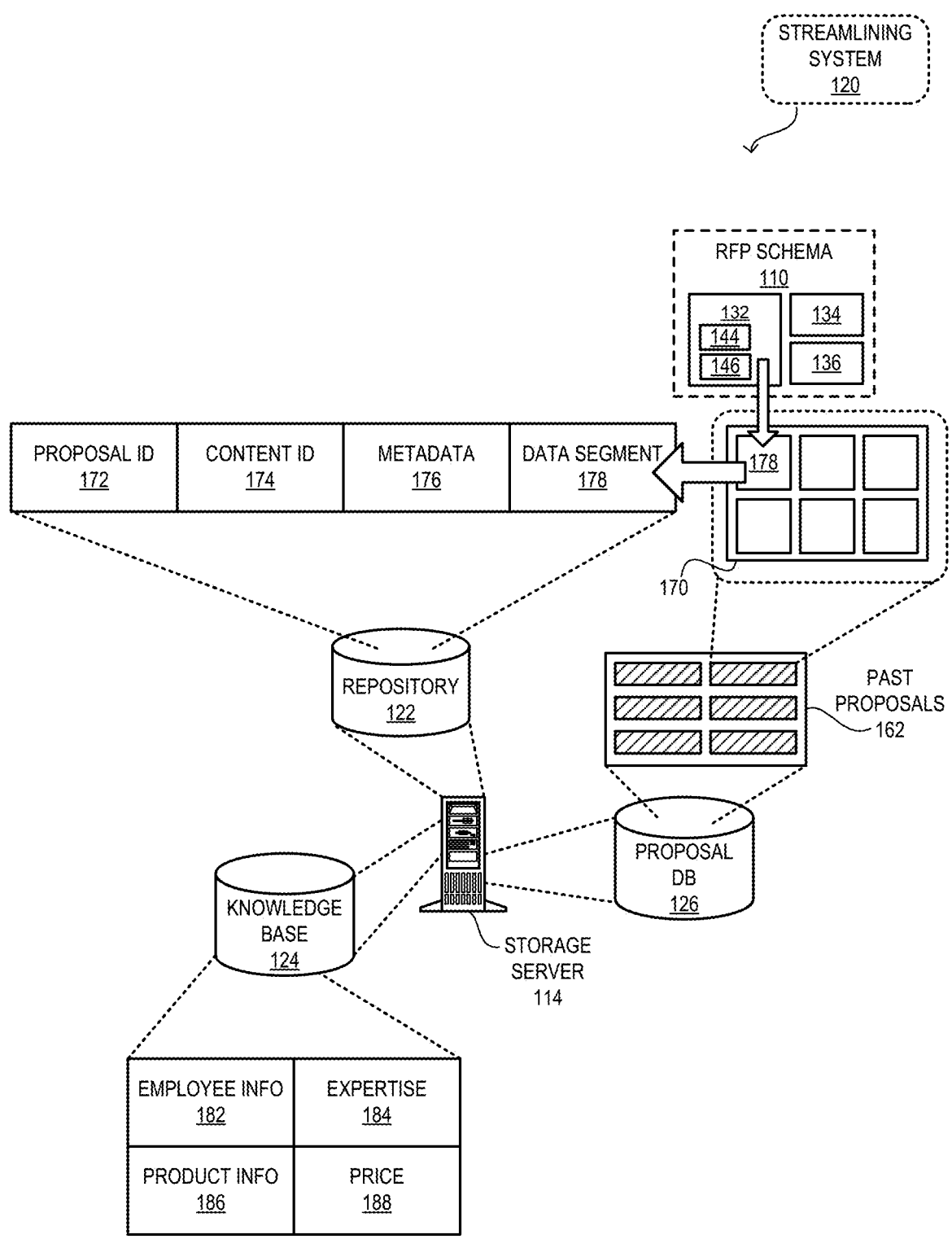
FIG. 1B illustrates an exemplary repository and an exemplary knowledge base for a streamlining system, in accordance with an embodiment of the present application.

Since schema 110 is a general outline of an RFP and includes a set of elements, a respective element of schema 110 corresponds to a piece of information that a generic RFP may include. Using schema 110, system 120 can automatically populate repository 122. FIG. 1B illustrates an exemplary repository and an exemplary knowledge base for a streamlining system, in accordance with an embodiment of the present application. System 120 can parse schema 110 and identify the elements, such as elements 132, 134, and 136, in schema 110. Examples of an element of schema 110 include, but are not limited to, scope of work, key performers and corresponding expertise, insurance information, organizational history, team biography, and product information (e.g., pricing information). A respective element can include one or more designated fields corresponding to attributes of the RFP. For example, if element 132 is product information, designated fields 144 and 146 in element 132 can be product name and pricing, respectively. Designated fields 144 and 146 can indicate attributes associated with element 132.

The enterprise can maintain a proposal database 126 of past proposals 162 that the enterprise has generated/submitted. System 120 can obtain a respective proposal from past proposals 162, identify the elements defined in schema 110, and extract pieces of content (e.g., snippets of text) from that proposal. System 120 then stores the extracted pieces of content in repository 122. If proposal 170 is in past proposals 162 and stored in proposal database 126, system 120 can retrieve proposal 170 from proposal database 126, identify portions of proposal 170 that correspond to elements 132, 134, and 136, and extract those portions from proposal 170.

System 120 can store the extracted portions corresponding to elements 132, 134, and 136 in repository 122 in a format similar to schema 110. This allows system 120 to search repository 122 based on an element of structured RFP 140. In this way, schema 110 can provide a structure/format in which pieces of content obtained from previous proposals are stored. For example, the extracted portion corresponding to element 132 can include a piece of content (e.g., a data segment) 178 of proposal 170. Piece of content 178 can include values for the attributes indicated by designated fields 144 and 146. As described above, if element 132 corresponds to product pricing, system 120 obtains product names (indicated by designated field 144) and corresponding product pricing (indicated by designated field 146) from proposal 170.

System 120 can store piece of content 178 in repository 122 in association with one or more of: a proposal identifier 172 of proposal 170, a content identifier 174 of piece of content 178, and metadata 176 associated with data segment 178. Metadata 176 can include keywords associated with data segment 178. System 120 can store piece of content 178 in repository 122 in such a way that system 120 can search the contents in piece of content 178 using a keyword. This allows system 120 to search repository 122 for a text segment of RFP 130. System 120 can repeat this process for a respective proposal in proposal database 126 for a respective element in schema 110. In this way, system 120 can automatically populate repository 122 with pieces of content from previous proposals 162 that can be reused for a new proposal.

Furthermore, to enable automatic content generation for the new proposal, system 120 can maintain knowledge base 124. Knowledge base 124 can represent a knowledge graph of the offerings and capabilities of the enterprise. The capabilities of the enterprise can include the employees of the enterprise and the expertise they offer. On the other hand, the offerings of the enterprise can include the products of the enterprise and their prices. Knowledge base 124 can then include employee information 182 and the corresponding expertise 184 for a respective employee of the enterprise. Similarly, knowledge base 124 can then include product information 186 and the corresponding price 188 for a respective product of the enterprise.

Schema-Based Proposal Generation

Figure 2A:
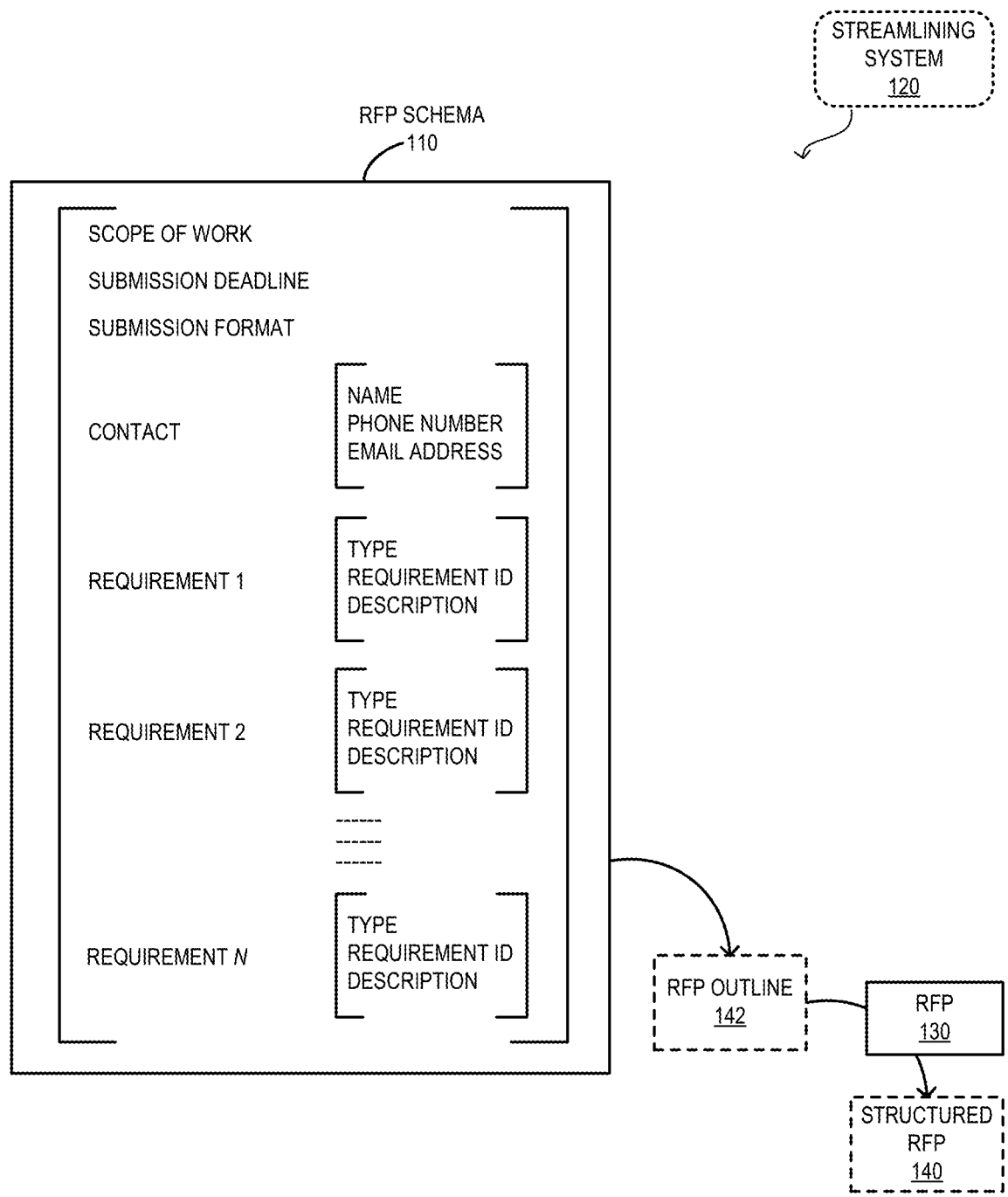
FIG. 2A illustrates an exemplary RFP schema, in accordance with an embodiment of the present application.

FIG. 2A illustrates an exemplary RFP schema, in accordance with an embodiment of the present application. Schema 110 can outline the elements that are typically included in an RFP. For example, schema 110 can include the scope of work, submission deadline, and the submission format for a proposal. Schema 110 can also include contact information of the enterprise, which can further include one or more designated fields corresponding to name, phone number, and email address. Moreover, schema 110 can include placeholders for a plurality of requirements. Each requirement can further include one or more designated fields corresponding to type, requirement identifier, and description of the requirement.

System 120 can generate an outline 142, which can be a structured outline of RFP 130. In some embodiments, system 120 can generate outline 142 based on schema 110. System 120 can identify the elements of schema 110 that are present in RFP 130 to identify the high-level structural elements of RFP 130 and include unpopulated placeholders, as they appear in schema 110, in outline 142. Outline 142 can be considered as a container and include a number of slots. A respective slot can be associated with an element of schema 110 and can be populated by system 120 with the phrases, attributes, and values of RFP 130 (e.g., task specification, information requirement, etc.) that correspond to that element of schema 110. Outline 142 can also include slots for information specific to RFP 130. Each slot, when populated, can be referred to as an element in a structured RFP.

System 120 can use one or more computational techniques to identify a text segment, which includes attributes and values, of RFP 130 that matches a slot of outline 142. Examples of a computational technique include, but are not limited to, string pattern matching and statistical modeling. System 120 then inserts the extracted text into the matched slot of outline 142. System 120 can repeat this process for a respective slot of outline 142. In this way, system 120 populates outline 142, thereby generating a structured representation of RFP 130, which is referred to as structured RFP 140. Structured RFP 140 can be considered as a machine-readable version of RFP 130 based on which system 120 can retrieve information for generating a proposal.

Figure 2B:
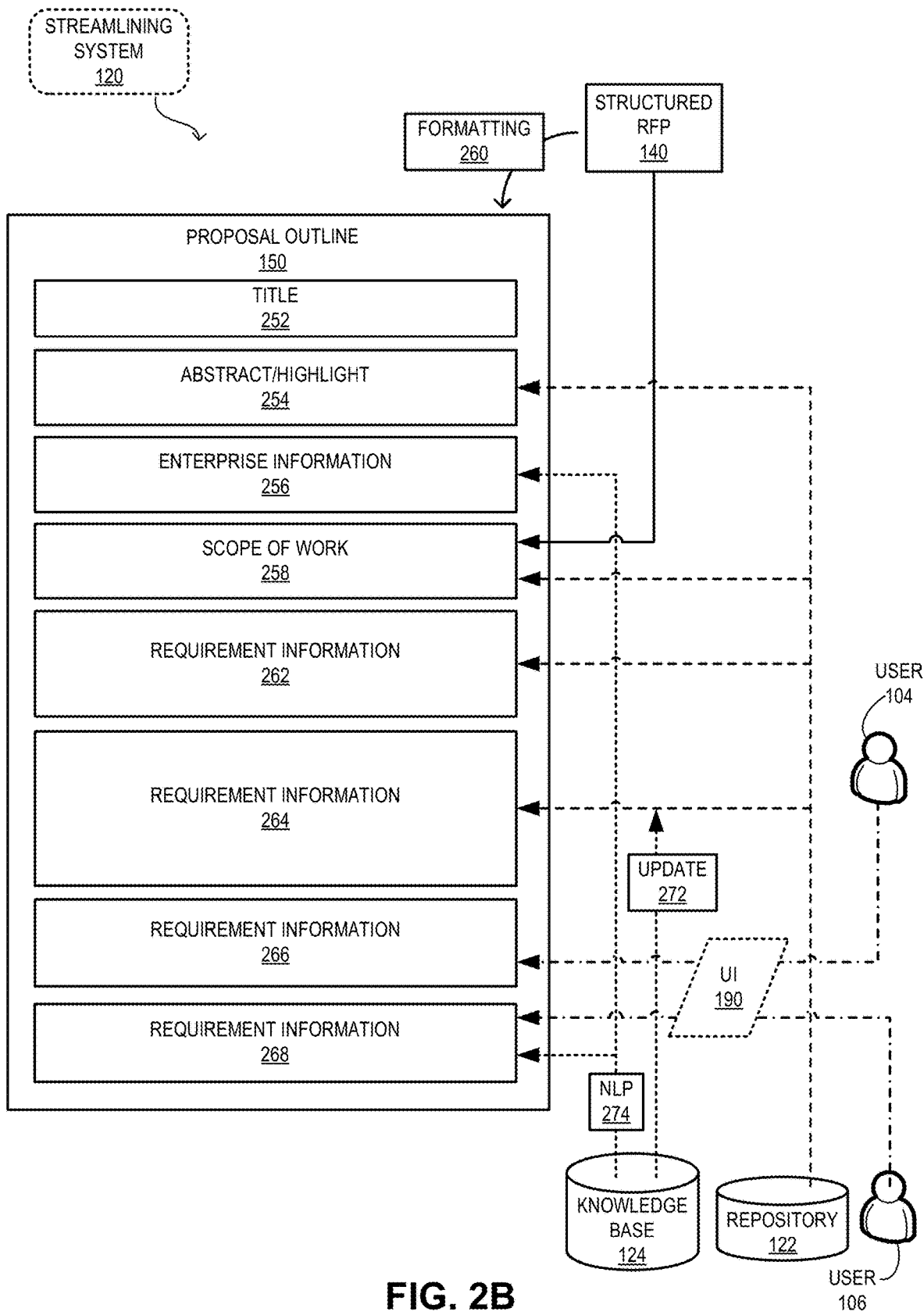
FIG. 2B illustrates an exemplary process of populating a proposal outline, in accordance with an embodiment of the present application.

FIG. 2B illustrates an exemplary process of populating a proposal outline, in accordance with an embodiment of the present application. System 120 can obtain formatting information 260 from structured RFP 140 and generate proposal outline 150 based on formatting information 260. Proposal outline 150 can include a number of sections, such as title 252, abstract/highlight 254, enterprise information 256, scope of work 258, and requirement information sections 262, 264, 266, and 268. Each of these sections can correspond to an element of structured RFP 140. In some embodiments, system 120 can generate the contents of some sections from structured RFP 140. For example, system 120 can determine what should be the scope of the proposal from structured RFP 140 and populate scope of work 258 using contents from structured RFP 140.

System 120 then checks whether a piece of content in repository 122 can be inserted into a section of outline 150. If the scope of the proposal is similar to a previous proposal, system 120 can obtain that piece of content from repository 122 and inserts that piece of content into scope of work section 258 (denoted with dashed lines). In some embodiments, system 120 uses a matching technique to search for a piece of content. For example, if a previously submitted abstract can be reused, system 120 can obtain the similar abstract from repository 122 using the matching technique and inserts the similar abstract into abstract/highlight section 254. To do so, system 120 determines what should be in the abstract section based on the corresponding element in structured RFP 140, such as a block of text. System 120 then uses a matching technique, such as word embedding, to search for the text from structured RFP 140 in repository 122. System 120 can vectorize the text, project the text onto the search space of repository 122, and determine which piece of content matches the text.

System 120 can determine what should be in requirement information section 262 based on the corresponding element in structured RFP 140. System 120 then searches repository 122 using the element in structured RFP 140, obtains a piece of content that matches the search, and inserts the piece of content into requirement information section 262. In the same way, system 120 can obtain a piece of content from repository 122 based on the corresponding element in structured RFP 140. However, system 120 can determine that the piece of content should be updated before inserting the piece of content into outline 150. Accordingly, system 120 can update the piece of content from repository 122 using update information 272 (e.g., from knowledge base 124) and insert the piece of content into requirement information section 264. For example, if the piece of content includes product pricing, update information 272 can be the updated pricing information. System 120 can obtain the updated pricing information from knowledge base 124, update the pricing information, and inserts the updated pricing information into outline 150.

If system 120 does not find a match in repository 122, system 120 can obtain information from knowledge base 124. For example, system 120 can obtain information associated with the enterprise and inserts the obtained information into enterprise information section 256. System 120 can also use text generating techniques, such as NLP 274, to generate text based on knowledge base 124. For example, system 120 can use knowledge base 124 to generate text for requirement information section 268. System 120 may ask user 106 to verify the generated text via UI 190. Upon verification, system 120 inserts the text into information section 268.

If system 120 cannot generate the text (e.g., no corresponding information available in knowledge base 124), system 120 can use UI 190 to solicit the corresponding information from user 104, who can be a human expert for the subject matter associated with the section, such as requirement information section 266. System 120 obtains the text (and figures) provided by user 104 via UI 190 and inserts the obtained text (and figures) into requirement information section 266. In this way, system 120 can populate a respective section of proposal outline 150 by matching pieces of content from past proposals in repository 122, generating text based on the knowledge graph indicated by knowledge base 124, or soliciting information from human experts who can supply new content for insertion into proposal outline 150.

User Interface

Figure 3A:
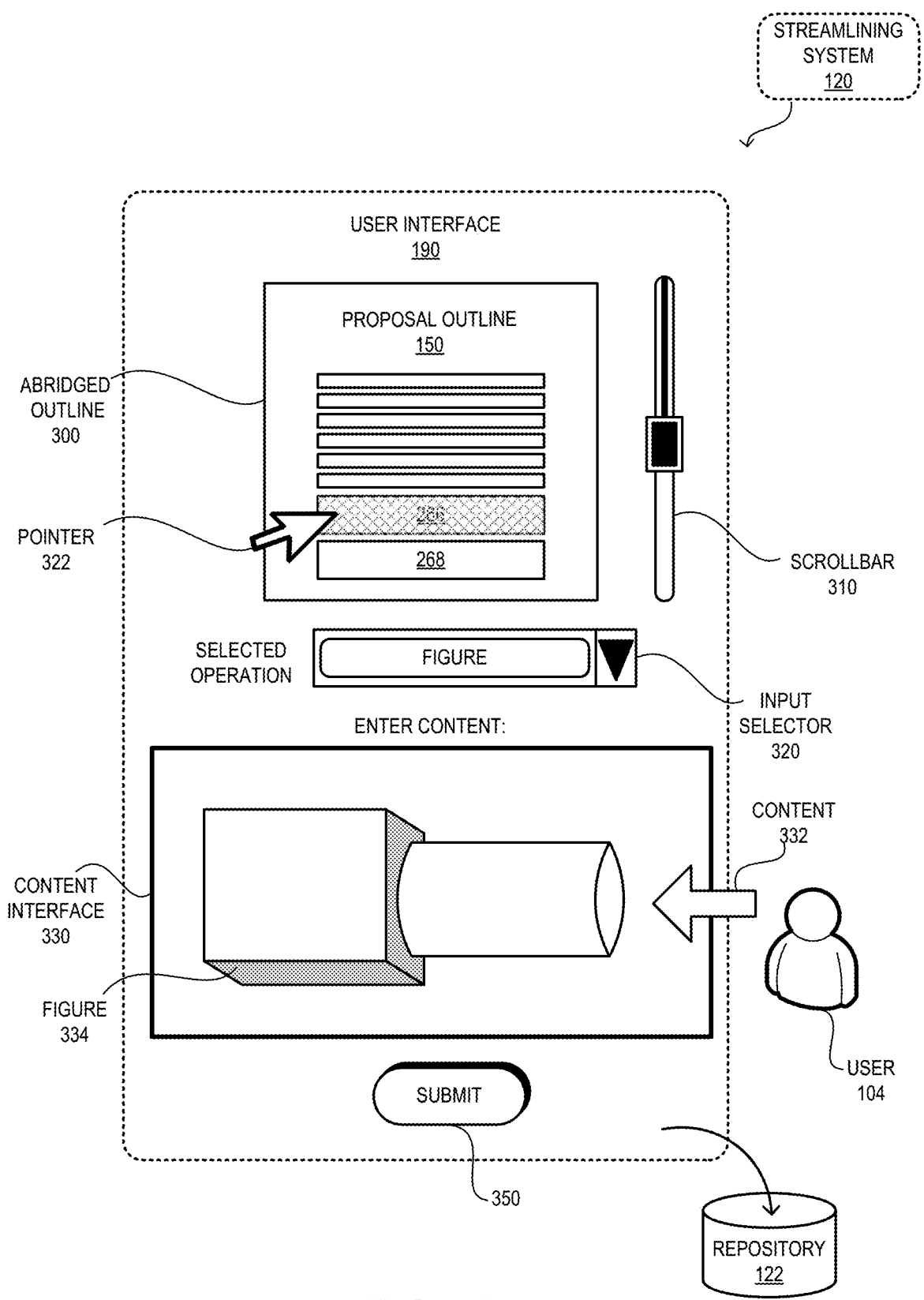
FIG. 3A illustrates an exemplary insertion of user-provided content into a proposal outline from a specialized user interface of a streamlining system, in accordance with an embodiment of the present application.

FIG. 3A illustrates an exemplary insertion of user-provided content into a proposal outline from a specialized user interface of a streamlining system, in accordance with an embodiment of the present application. System 120 can use a specialized UI 190 to allow a user to generate content for a specific section of proposal outline 150. UI 190 can be specifically designed for facilitating (and verifying) a piece of content for proposal outline 150. During operation, if system 120 cannot generate text for a specific section of outline 150, system 120 can present UI 190 to user 104 for obtaining the piece of content.

To provide context to user 104, UI 190 can include outline 150. This allows user 104 to understand what has been generated and inserted in outline 150 by system 120. In some embodiments, UI 190 can show an "abridged outline" 300 of proposal outline 150. Abridged outline 300 may show the headers of the sections of outline 150. UI 190 can include a scrollbar 310 for scrolling up and down on outline 150. User 104 can use a pointer 322 (e.g., a mouse pointer) to select a section from abridged outline 300. User 104 can use other selection devices, such as a touchscreen, a keyboard, or a gesture detector, to select a section from abridged outline 300. The selected section can become highlighted on abridged outline 300.

In the example in FIG. 2B, system 120 obtains the text and/or figure for section 266 of outline 150 from user 104. To help user 104 to select the correct section, UI 190 can pre-select section 266. UI 190 can include a content interface 330, which allows user 104 to provide a piece of content 332 to system 120. UI 190 can also include an input selector 320, which allows user 104 to select whether to input text or a figure. Based on the selection on input selector 320, content interface 330 can become a text input interface or a drawing interface. For example, if user 104 selects "figure" as the intended operation using input selector 320, user 104 can draw a FIG. 334 on content interface 330. If user 104 toggles between text and figure, the provided content can be automatically saved.

User 104 can use input devices, such as a pointing device, a touchscreen, a keyboard, a gesture detector, a microphone (e.g., for speech-to-text conversion), a camera, and a scanner (e.g., for optical character recognition (OCR)), to generate the text and figure(s) of piece of content 332 using content interface 330. Upon completing piece of content 332, user 104 can submit piece of content 332 to system 120 by pressing submit button 350 of UI 190. System 120 obtains the text (and figures) provided by user 104 via content interface 330 and inserts the obtained text (and figures) into section 266. System 120 can also store piece of content 332 into repository 122, as described in conjunction with FIG. 1B, for future proposals. In this way, UI 190 can allow user 104 to provide piece of content 332 to system 120 for section 266.

Figure 3B:
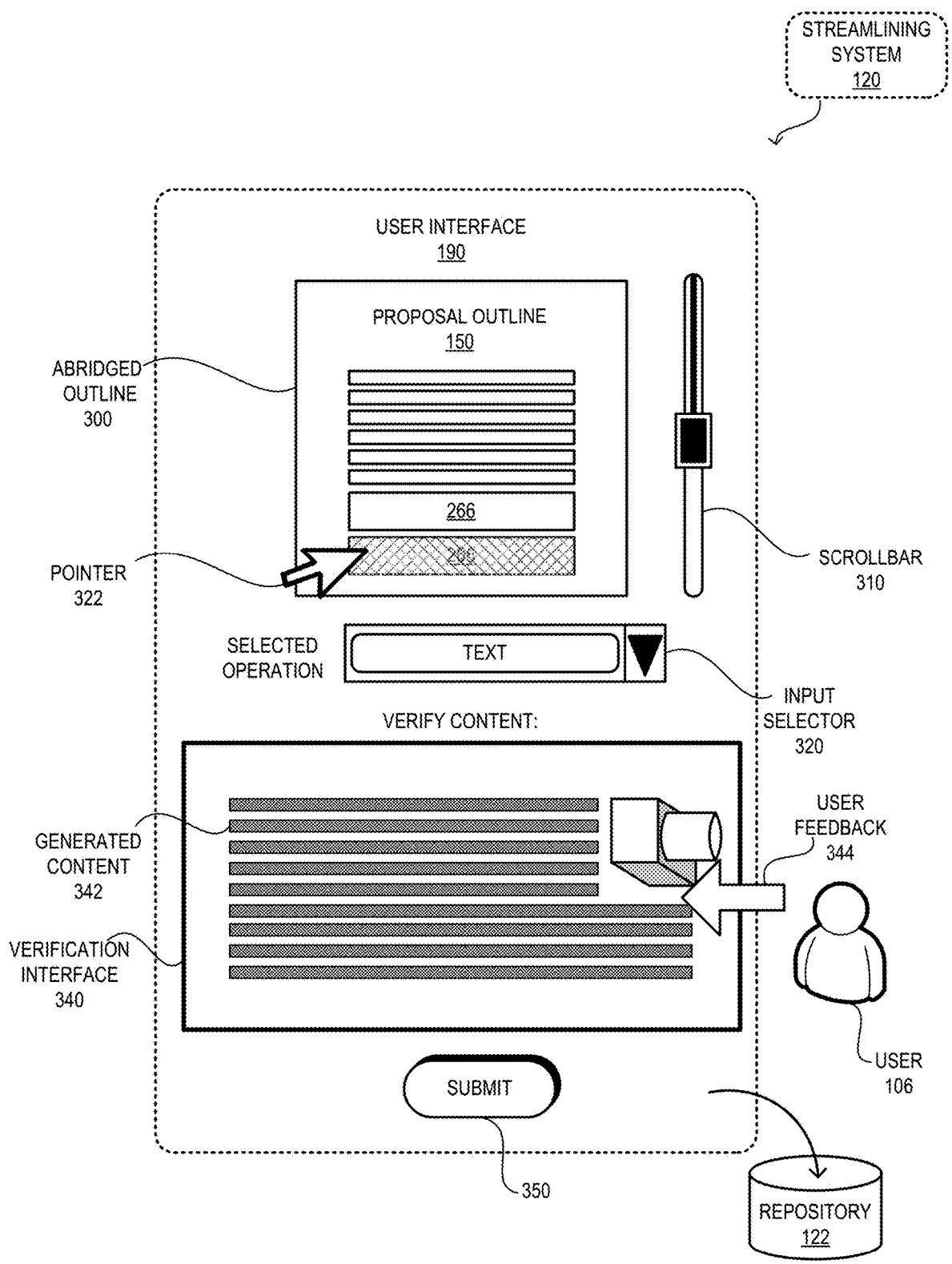
FIG. 3B illustrates an exemplary verification of system-generated content of a proposal outline using a specialized user interface of a streamlining system, in accordance with an embodiment of the present application.

FIG. 3B illustrates an exemplary verification of system-generated content of a proposal outline using a specialized user interface of a streamlining system, in accordance with an embodiment of the present application. If system 120 does not find a match in repository 122, system 120 can use text generating techniques, such as NLP, to generate a piece of content 342 based on knowledge base 124. In the example in FIG. 2B, system 120 uses knowledge base 124 to generate a piece of content 342, which may include text and figure(s), for section 268. UI 190 can present piece of content 342 to user 106 via a verification interface 340. To help user 106 to select the correct section, UI 190 can pre-select section 268.

User 106 can update piece of content 342 by providing user feedback 344, which can include updates to text and/or figure(s). User 106 can use input selector 320 to select to whether to provide feedback for the text or the figure(s) in piece of content 342. Upon updating piece of content 342, user 106 can submit user feedback 344 to system 120 by pressing submit button 350 of UI 190. System 120 obtains the text (and figures) updated by user 106 via verification interface 340 and inserts the obtained text (and figures) into section 268. System 120 can also store updated piece of content 342 into repository 122, as described in conjunction with FIG. 1B, for future proposals. In this way, UI 190 can allow user 106 to update generated piece of content 342 for section 268.

Operations

Figure 4:
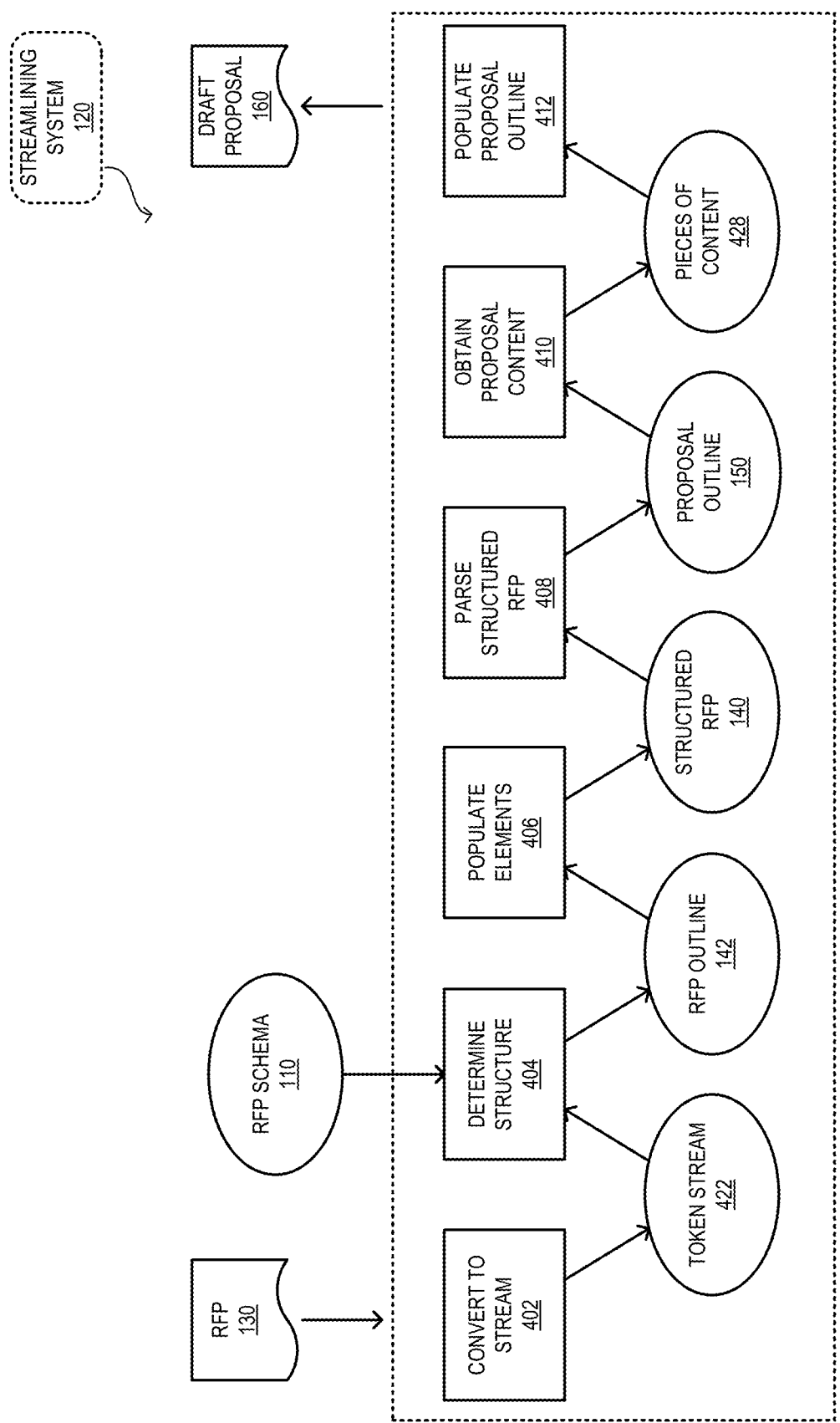
FIG. 4 illustrates an exemplary streamlining process of populating a proposal outline, in accordance with an embodiment of the present application.

FIG. 4 illustrates an exemplary streamlining process of populating a proposal outline, in accordance with an embodiment of the present application. System 120 utilizes the fact that RFPs typically follow a relatively standard format across most industries. System 120 analyzes the format of RFP 130 to identify a respective element of RFP 130 and the requirements specified in that element. During operation, system 120 converts the document file of RFP 130 into a token stream 422 (e.g., based on one or more delimiters) for subsequent phases to process (operation 402). Examples of a document file include, but are not limited to, a word processing file (e.g., Microsoft Word), a spreadsheet (e.g., Microsoft Excel), a presentation (e.g., Microsoft PowerPoint), and a portable document (e.g., Portable Document Format (PDF) or GhostScript (GS)). System 120 can use standard tokenization techniques to generate token stream from RFP 130.

System 120 then identifies sections of RFP 130 collecting information related to schema 110 and generates structured outline 142 of RFP 130 (operation 404). Outline 142 can include the classification of elements of RFP 130 (e.g., a high-level structure of RFP 130), such as a headline, contact information, task specification, etc. System 120 identifies relations, questions, and requirements based on section information in outline 142, and determines phrases in RFP 130 corresponding to the elements of schema 110. In some embodiments, system 120 can use a classifier or a sequencing algorithm to determine the phrases. For example, elements in past RFPs can be labeled and used to train the classifier. System 120 can apply the classifier to RFP 130 to determine the phrases that constitute a task corresponding to the slots in outline 142. System 120 can also use the sequencing algorithm to determine a sequence of words that constitutes a task (e.g., using a Markov model) corresponding to the slots in outline 142.

System 120 then inserts the identified phrases into RFP outline 142 to populate it and generate structured RFP 140 (operation 406). System 120 parses structured RFP 140 to generate a proposal outline 150 in such a way that outline 150 includes a section corresponding to an element in structured RFP 140 (operation 408). Using structured RFP 140, system 120 obtains pieces of content 428 for a respective section of outline 150 (operation 410). System 120 can obtain pieces of content 428 by automatically generating new text from the organizational knowledge graph using NLP, searching for previously used pieces of content that match the current request in a repository, and soliciting the information from a user. System 120 populates outline 150 using pieces of content 428 to generate draft proposal 160 (operation 412).

Figure 5A:
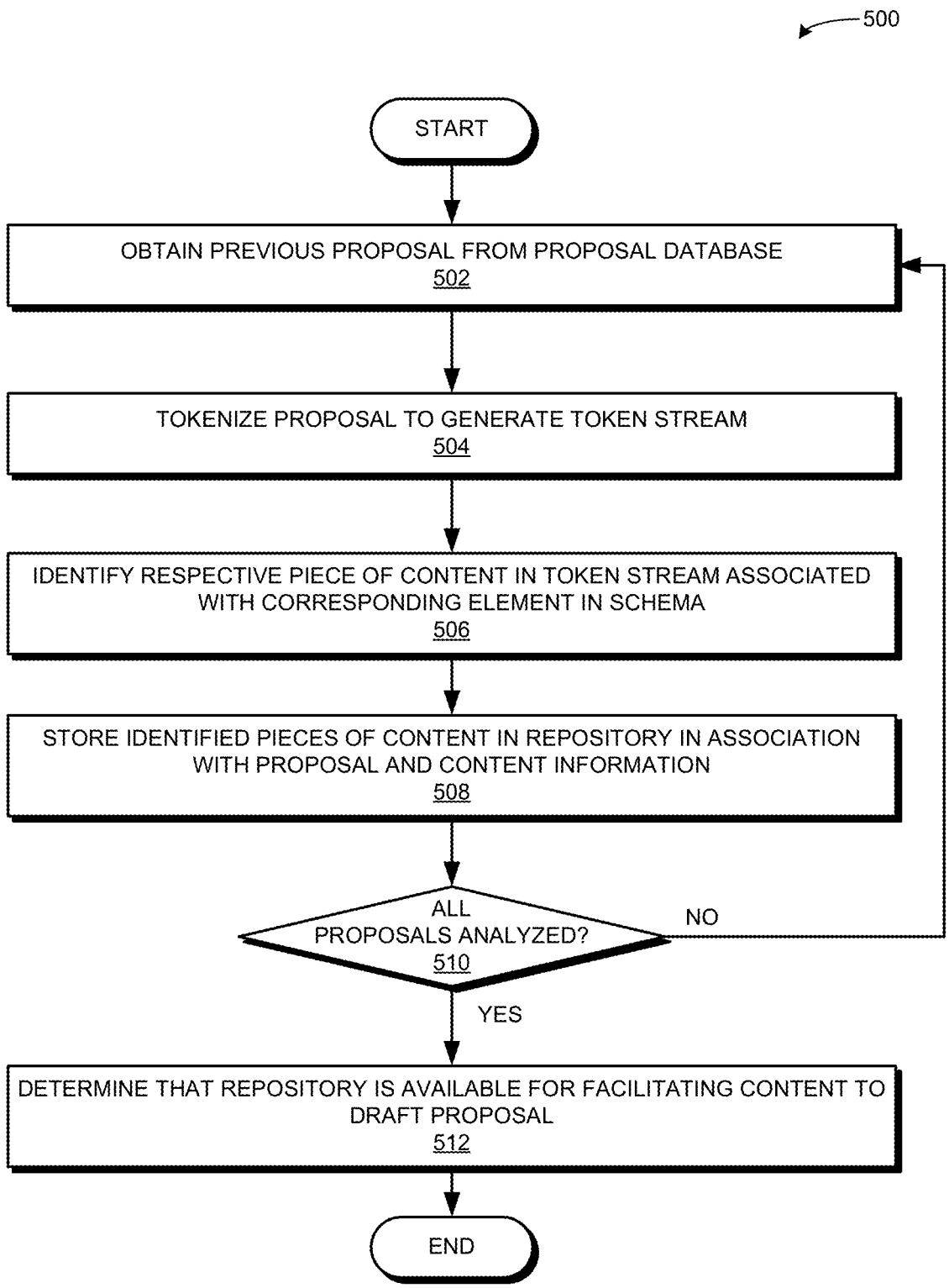
FIG. 5A presents a flowchart illustrating a method of a streamlining system populating a repository with contents from previous proposals, in accordance with an embodiment of the present application.

FIG. 5A presents a flowchart illustrating a method 500 of a streamlining system populating a repository with contents from previous proposals, in accordance with an embodiment of the present application. During operation, the system obtains a previous proposal from the proposal database (operation 502) and tokenizes the proposal to generate a token stream (operation 504). The system identifies a respective piece of content in the token stream associated with a corresponding element in the schema (operation 506). The system then stores the identified pieces of content in the repository in association with the proposal and content information, as described in conjunction with FIG. 1B (operation 508). The system then checks whether all proposals in the proposal database have been checked (operation 510). If all proposals have not been checked, the system continues to obtain the next proposal from the proposal database (operation 502). On the other hand, if all proposals have been checked, the system determines that the repository is ready for facilitating content to a draft proposal (operation 512).

Figure 5B:
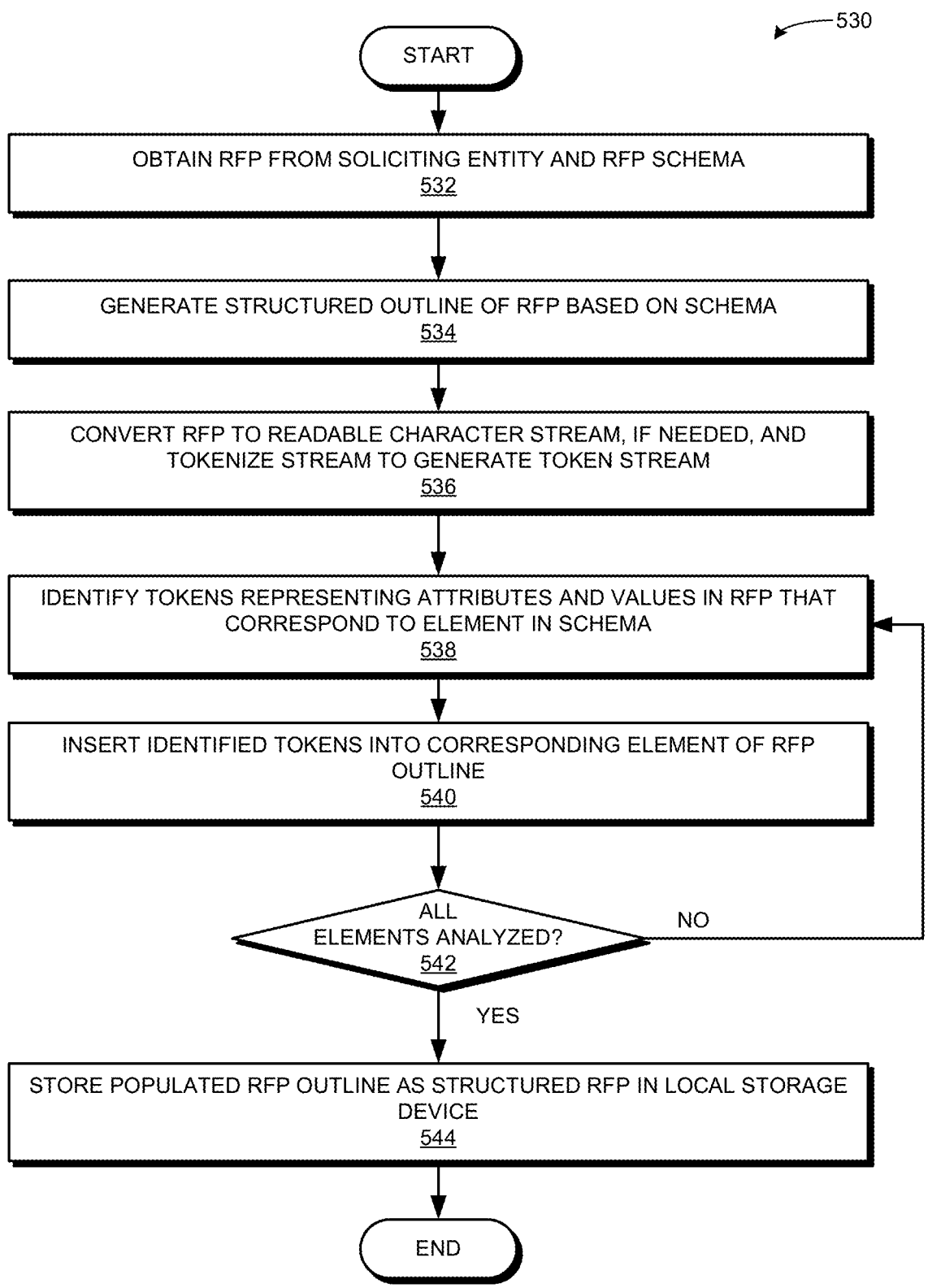
FIG. 5B presents a flowchart illustrating a method of a streamlining system generating a structured representation of an RFP, in accordance with an embodiment of the present application.

FIG. 5B presents a flowchart illustrating a method 530 of a streamlining system generating a structured representation of an RFP, in accordance with an embodiment of the present application. During operation, the system obtains the RFP from a soliciting entity and the RFP schema (operation 532) and generates a structured outline of the RFP based on the schema (operation 534). This structured outline is the RFP outline of the RFP. In some embodiments, the system can identify the elements of the schema that are present in the RFP to identify the high-level structural element of the RFP. The system then includes unpopulated placeholders, as they appear in schema 110, in the RFP outline.

The system then converts the RFP document to a readable character stream (e.g., using OCR), if needed, and tokenizes the stream to generate a token stream (operation 536). The system identifies the tokens representing attributes and values in the RFP that correspond to an element in the schema (operation 538), and inserts the identified tokens into the corresponding element of the RFP outline (operation 540).

For example, the system can determine phrases in the token stream corresponding to the elements of the schema using a classifier or a sequencing algorithm to determine the phrases. The system then checks whether all elements of the RFP outline have been analyzed (operation 542). If all elements have not been analyzed, the system continues to identify the tokens representing attributes and values in the RFP that correspond to another element in the schema (operation 538). If all elements have been analyzed, the system stores the populated RFP outline as the structured RFP in the local storage device (operation 544).

Figure 5C:
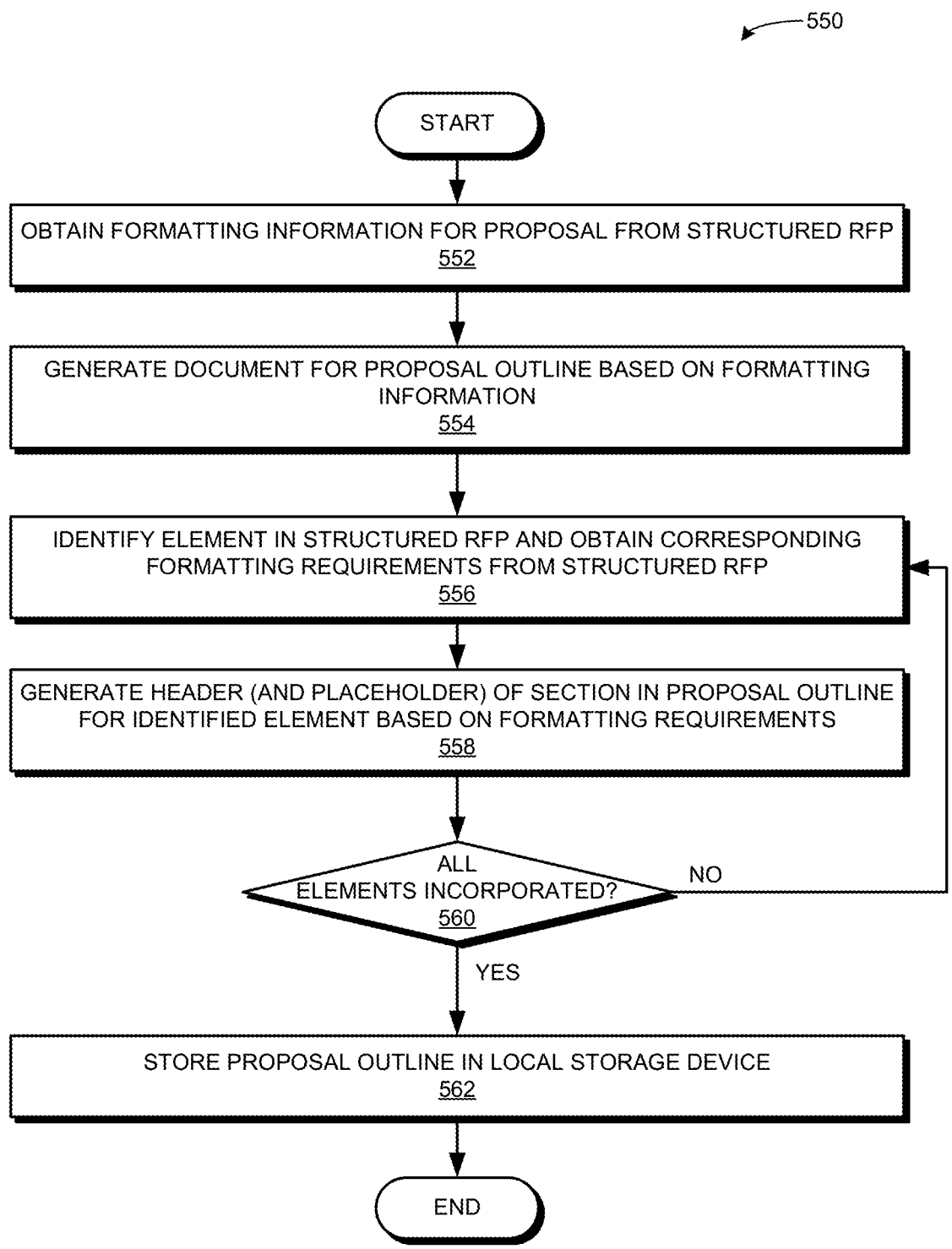
FIG. 5C presents a flowchart illustrating a method of a streamlining system generating a proposal outline based on a structured RFP, in accordance with an embodiment of the present application.

FIG. 5C presents a flowchart illustrating a method 550 of a streamlining system generating a proposal outline based on a structured RFP, in accordance with an embodiment of the present application. During operation, the system obtains formatting information (e.g., font size, page margins, page limit, etc.) for the proposal from the structured RFP (operation 552), and generates a document for the proposal outline based on the formatting information (operation 554). The system identifies an element in the structured RFP and obtains the corresponding formatting requirements from the structured RFP (operation 556).

The system then generates the header (and placeholder) of a section in the proposal outline for the identified element based on the formatting requirements (operation 558). For example, the system can use the font face and size suggested by the formatting requirements to generate the header. The system then checks whether all elements in the structured RFP have been incorporated into the proposal outline (operation 560). If all elements in the structured RFP have not been incorporated, the system continues to identify another element in the structured RFP and obtain the corresponding formatting requirements from the structured RFP (operation 556). If all elements in the structured RFP have been incorporated, the system stores the proposal outline in a local storage device (operation 562).

Figure 6:
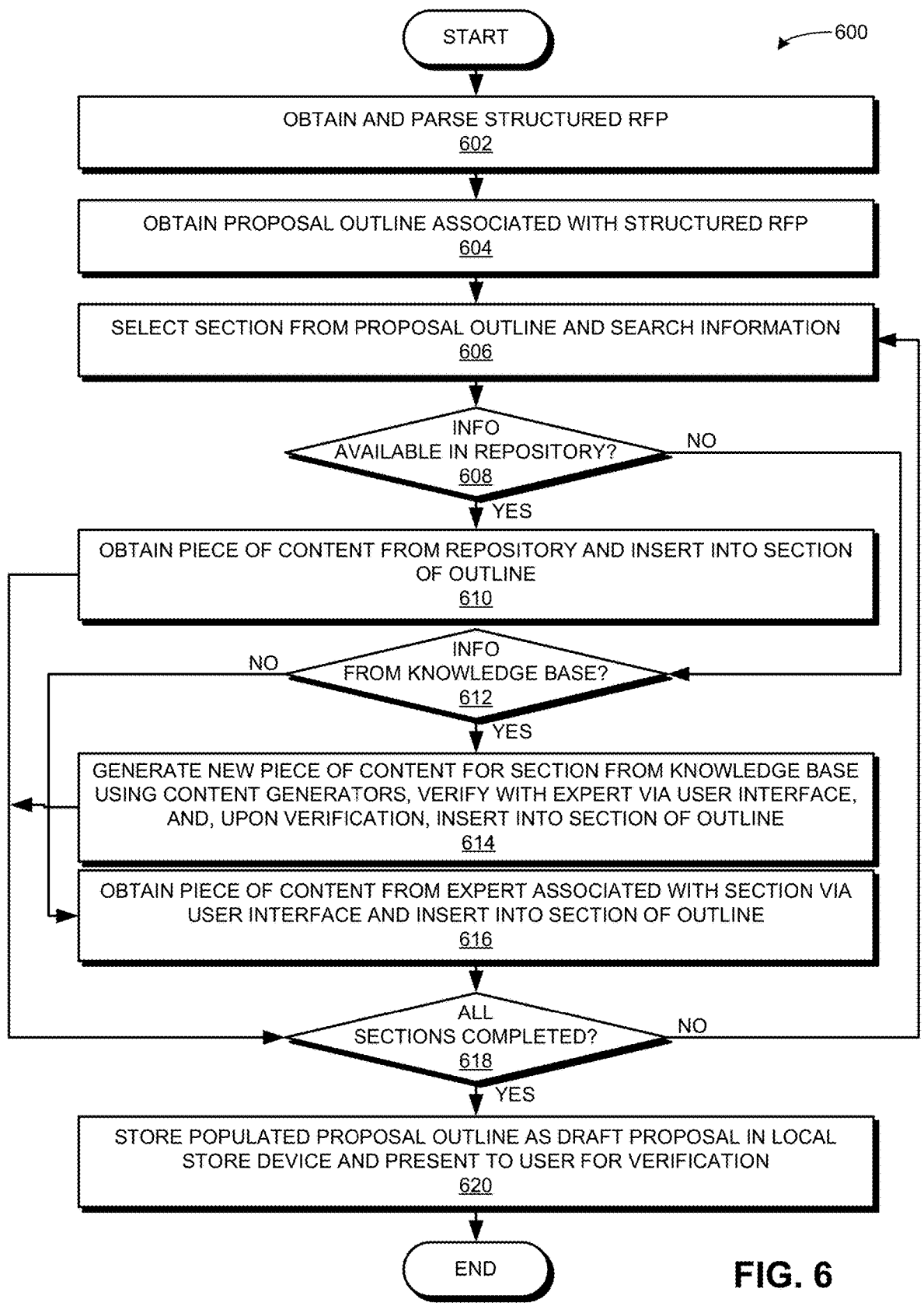
FIG. 6 presents a flowchart illustrating a method of a streamlining system generating a draft proposal based on an RFP schema, in accordance with an embodiment of the present application.

FIG. 6 presents a flowchart illustrating a method 600 of a streamlining system generating a draft proposal based on an RFP schema, in accordance with an embodiment of the present application. During operation, the system obtains and parses a structured RFP (operation 602) and obtains the proposal outline associated with the structured RFP (operation 604). The system selects a section from the proposal outline and searches for the information (e.g., a piece of content) for that section (operation 606). The system can determine what to search for based on the corresponding element of the structured RFP. The system then checks whether the information is available in a piece of content in the repository (operation 608).

If the information is available in the repository, the system obtains the piece of content from the repository and inserts the content into the section of the outline (operation 610). If the information is not available in the repository, the system checks whether a piece of content comprising the information is obtainable or can be generated from the knowledge base (operation 612). If the information is obtainable or can be generated from the knowledge base, the system can generate a new piece of content, which can include text and/or figures, using one or more content generators (e.g., NLP), verify the piece of content with an expert via a specialized UI, and upon verification, insert the content into the section of the outline (operation 614).

If the information is not obtainable or cannot be generated from the knowledge base, the system can obtain a piece of content from an expert associated with the section via the UI and insert the content into the section of the outline (operation 616). Upon inserting the content into the section of the outline (operation 610, 614, or 616), the system checks whether all sections of the outline have been completed (operation 618). If all sections of the outline have not been completed, the system continues to select another section from the proposal outline and searches for the information for that section (operation 606). If all sections of the outline have been completed, the system stores the populated proposal outline as the draft proposal in the local storage device and presents the draft proposal to the user for verification (using the UI) (operation 620).

Exemplary Computer System and Apparatus

Figure 7:
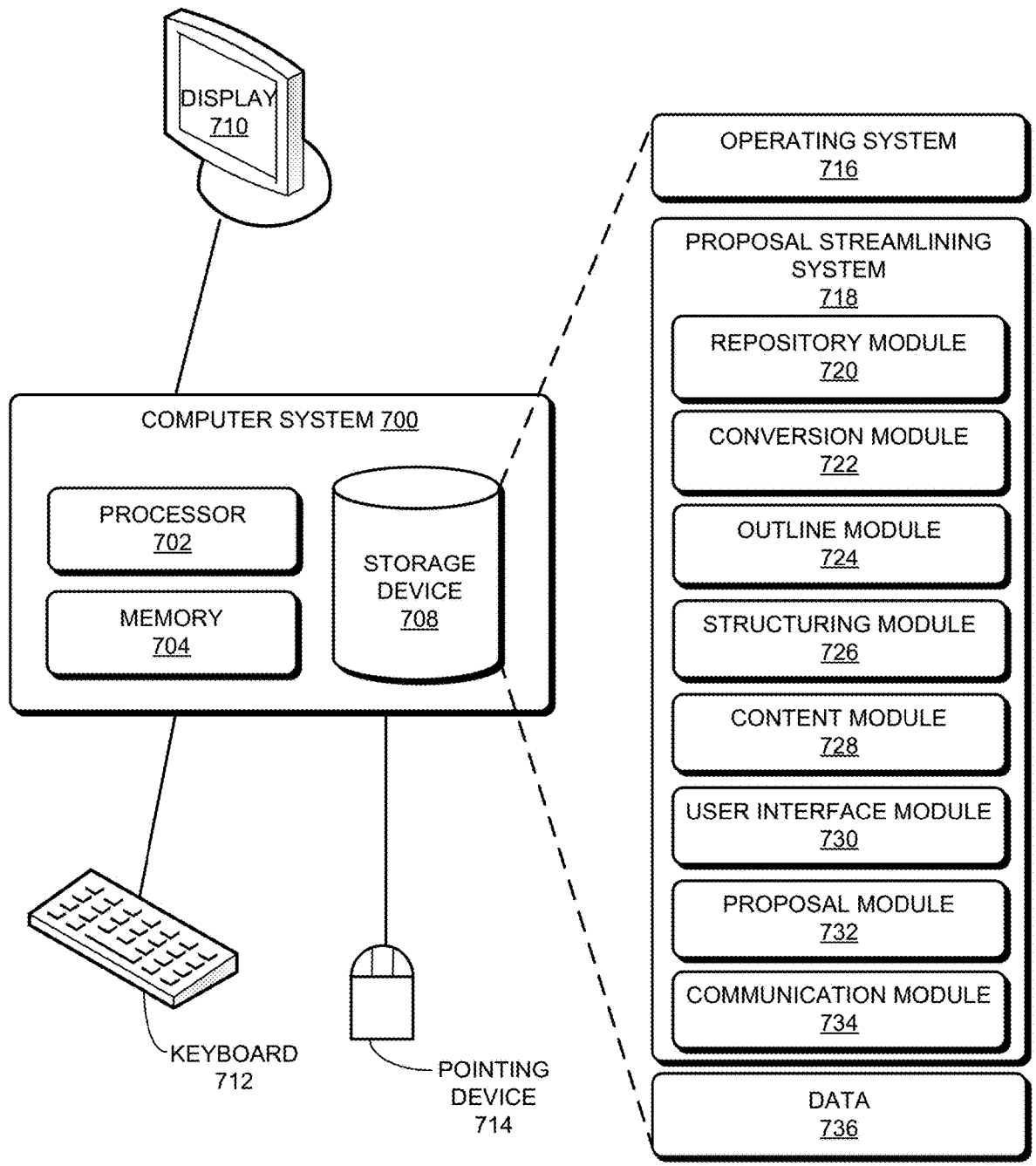
FIG. 7 illustrates an exemplary computer system that facilitates a streamlining system, in accordance with an embodiment of the present application.

FIG. 7 illustrates an exemplary computer system that facilitates a streamlining system, in accordance with an embodiment of the present application. Computer system 700 includes a processor 702, a memory device 704, and a storage device 708. Memory device 704 can include a volatile memory device (e.g., a dual in-line memory module (DIMM)). Furthermore, computer system 700 can be coupled to a display device 710, a keyboard 712, and a pointing device 714. Storage device 708 can store an operating system 716, a proposal streamlining system 718, and data 736.

Proposal streamlining system 718 can include instructions, which when executed by computer system 700 can cause computer system 700 to perform methods and/or processes described in this disclosure. Specifically, proposal streamlining system 718 can include instructions for generating and populating a repository of previous proposals (repository module 720). Proposal streamlining system 718 can also include instructions for obtaining an RFP document, converting the RFP document into a readable format, and tokenizing the document into a token stream (conversion module 722). Furthermore, proposal streamlining system 718 includes instructions for generating an RFP outline based on an RFP schema (outline module 724).

In addition, proposal streamlining system 718 includes instructions for generating a structured RFP by populating the RFP outline using phrases, attributes, and values from the RFP (structuring module 726). Proposal streamlining system 718 can also include instructions for generating a proposal outline based on the structured RFP and populating the proposal outline using pieces of content for the sections of the proposal outline (content module 728). To obtain the pieces of content, proposal streamlining system 718 can further include instructions for retrieving content from a repository, generating content based on a knowledge base, or obtaining content from a user via a user interface (content module 728). Moreover, proposal streamlining system 718 can also include instructions for facilitating the user interface (user interface module 730). In addition, proposal streamlining system 718 can also include instructions for generating a draft proposal from the populated proposal outline (proposal module 732).

Proposal streamlining system 718 may further include instructions for sending and receiving messages (communication module 734). Data 736 can include any data that can facilitate the operations of proposal streamlining system 718. Data 736 may include one or more of: a set of past proposals, a repository, a knowledge base, an organizational knowledge graph, RFPs, RFP outlines, structured RFPs, proposal outlines, generated pieces of content, obtained pieces of content, draft proposals, and final proposals.

Figure 8:
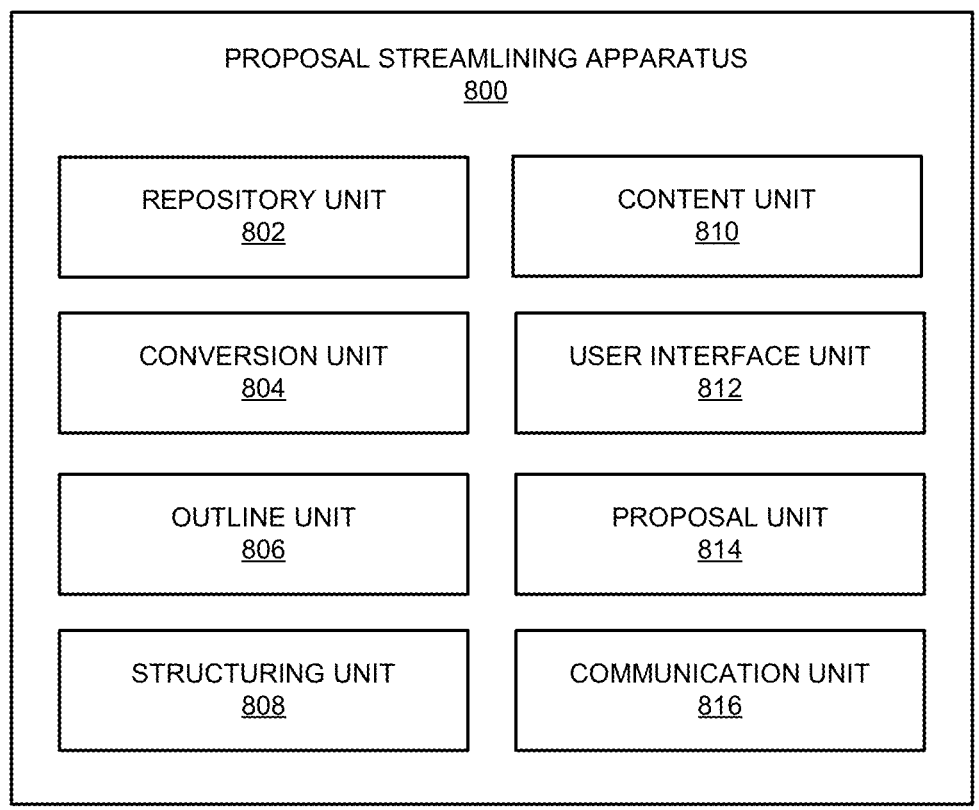
FIG. 8 illustrates an exemplary apparatus that facilitates a streamlining system, in accordance with an embodiment of the present application.

FIG. 8 illustrates an exemplary apparatus that facilitates a streamlining system, in accordance with an embodiment of the present application. Proposal streamlining apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device that is capable of communicating with other computer systems and/or devices. Specifically, apparatus 800 can comprise units 802-816, which perform functions or operations similar to modules 720-734 of computer system 700 of FIG. 7, including: a repository unit 802; a conversion unit 804; an outline unit 806; a structuring unit 808; a content unit 810; a user interface unit 812; a proposal unit 814; and a communication unit 816.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A method for generating a draft proposal, comprising:
obtaining a schema that represents a general model of a request for proposal (RFP);
generating a structured RFP from an RFP document representing an RFP by structuring one or more elements of the RFP document in the structured RFP based on the schema, wherein a respective element indicates a requirement of the RFP;
generating, corresponding to the RFP, a proposal outline comprising one or more sections, wherein a respective one of the one or more sections corresponds to one of the one or more elements;
obtaining a piece of content for a respective section of the one or more sections based on a requirement specified in an element corresponding to the section; and
inserting the piece of content in the section of the proposal outline.

2. The method of claim 1, further comprising generating a draft proposal by incorporating a corresponding piece of content into a respective section of the one or more sections.

3. The method of claim 2, further comprising obtaining formatting information for a proposal from the structured RFP, wherein the draft proposal is represented in a format indicated by the formatting information.

4. The method of claim 1, wherein obtaining the piece of content further comprises:
determining whether the requirement specified in the element matches an entry in a repository of past proposals; and
in response to finding a match in the repository, retrieving the piece of content from the entry in the repository.

5. The method of claim 4, further comprising:
identifying a piece of content in a past proposal that matches an element of the schema; and
storing the piece of content in the repository.

6. The method of claim 4, further comprising:
in response to not finding a match in the repository, obtaining the piece of content by one of:
generating the piece of content from an organizational knowledge graph; and
obtaining the piece of content from a user.

7. The method of claim 6, further comprising facilitating a specialized user interface to the user, wherein the user interface is used for one or more of:
verifying the piece of content generated from the organizational knowledge graph; and
obtaining the piece of content from the user.

8. The method of claim 4, further comprising updating the piece of content obtained from the repository prior to inserting the piece of content in the proposal outline.

9. The method of claim 1, wherein structuring an element of the RFP document in the structured RFP comprises:
matching attributes and values of the element in the RFP document to an element of the schema; and
incorporating the attributes and values into the structured RFP in a structure of the element in the schema.

10. The method of claim 9, further comprising:
tokenizing the RFP document into a token stream; and
identifying the attributes and values in the token stream.

11. A non-transitory computer-readable storage medium storing instructions that when executed by a computer cause the computer to perform a method for generating a draft proposal, the method comprising:
obtaining a schema that represents a general model of a request for proposal (RFP);
generating a structured RFP from an RFP document representing an RFP by structuring one or more elements of the RFP document in the structured RFP based on the schema, wherein a respective element indicates a requirement of the RFP;
generating, corresponding to the RFP, a proposal outline comprising one or more sections, wherein a respective one of the one or more sections corresponds to one of the one or more elements;
obtaining a piece of content for a respective section of the one or more sections based on a requirement specified in an element corresponding to the section; and
inserting the piece of content in the section of the proposal outline.

12. The computer-readable storage medium of claim 11, wherein the method further comprises generating a draft proposal by incorporating a corresponding piece of content into a respective section of the one or more sections.

13. The computer-readable storage medium of claim 12, wherein the method further comprises obtaining formatting information for a proposal from the structured RFP, wherein the draft proposal is represented in a format indicated by the formatting information.

14. The computer-readable storage medium of claim 11, wherein obtaining the piece of content further comprises:
   determining whether the requirement specified in the element matches an entry in a repository of past proposals; and
   in response to finding a match in the repository, retrieving the piece of content from the entry in the repository.

15. The computer-readable storage medium of claim 14, wherein the method further comprises:
   identifying a piece of content in a past proposal that matches an element of the schema; and
   storing the piece of content in the repository.

16. The computer-readable storage medium of claim 14, wherein the method further comprises:
   in response to not finding a match in the repository, obtaining the piece of content by one of:
      generating the piece of content from an organizational knowledge graph; and
      obtaining the piece of content from a user.

17. The computer-readable storage medium of claim 16, wherein the method further comprises facilitating a specialized user interface to the user, wherein the user interface is used for one or more of:
   verifying the piece of content generated from the organizational knowledge graph; and
   obtaining the piece of content from the user.

18. The computer-readable storage medium of claim 14, wherein the method further comprises updating the piece of content obtained from the repository prior to inserting the piece of content in the proposal outline.

19. The computer-readable storage medium of claim 11, wherein structuring an element of the RFP document in the structured RFP comprises:
   matching attributes and values of the element in the RFP document to an element of the schema; and
   incorporating the attributes and values into the structured RFP in a structure of the element in the schema.

20. The computer-readable storage medium of claim 19, wherein the method further comprises:
   tokenizing the RFP document into a token stream; and
   identifying the attributes and values in the token stream.

* * * * *